United States Patent

[11] 3,599,098

[72] Inventor James H. McPhail
Santa Clara, Calif.
[21] Appl. No. 802,086
[22] Filed Feb. 25, 1969
[45] Patented Aug. 10, 1971
[73] Assignee American Micro-Systems, Inc.
Santa Clara, Calif.

[54] ELECTRONIC TESTING APPARATUS
7 Claims, 2 Drawing Figs.

[52] U.S. Cl. .......... 324/158 T, 307/235, 307/262, 324/73, 328/147
[51] Int. Cl. .......... G01r 31/00, G06g 7/12
[50] Field of Search .......... 330/30 D, 69; 307/235, 262; 328/146, 147; 324/158 T, 158 R, 73

[56] References Cited

UNITED STATES PATENTS

| | | | |
|---|---|---|---|
| 3,274,501 | 9/1966 | Heinsen | 307/235 |
| 3,453,554 | 7/1969 | Shoemaker | 330/69 |
| 3,482,116 | 12/1969 | James | 307/262 |

*Primary Examiner*—Donald D. Forrer
*Assistant Examiner*—David M. Carter
*Attorney*—Owen, Wickersham & Erickson

ABSTRACT: A testing apparatus for logic circuit devices comprising a buffer amplifier pulse driver for driving capacitive loads with fast rise and fall times and for producing programmable output pulses at predetermined levels and in accordance with a predetermined logic pattern. The apparatus comprises a pair of operational amplifiers each adaptable to receive an input at a level equal to the desired output pulse. Each of the amplifiers has an output driver stage with an input connected to and driven by a current switch adaptable to receive a controlling logic input pulse in the same pattern desired at the apparatus output which is connected to the device being tested. The current switch provides the necessary drive to enable the output driver stages to bring the output to the desired level, and once that level is reached during each transition it is held constant by the operational amplifier until the next transition pulse from the logic input. The driver switches function to provide the pulse transitions to and from predetermined levels independent of the operational amplifiers and to hold the output at the desired level in conjunction with their operational amplifier.

Figure 1:
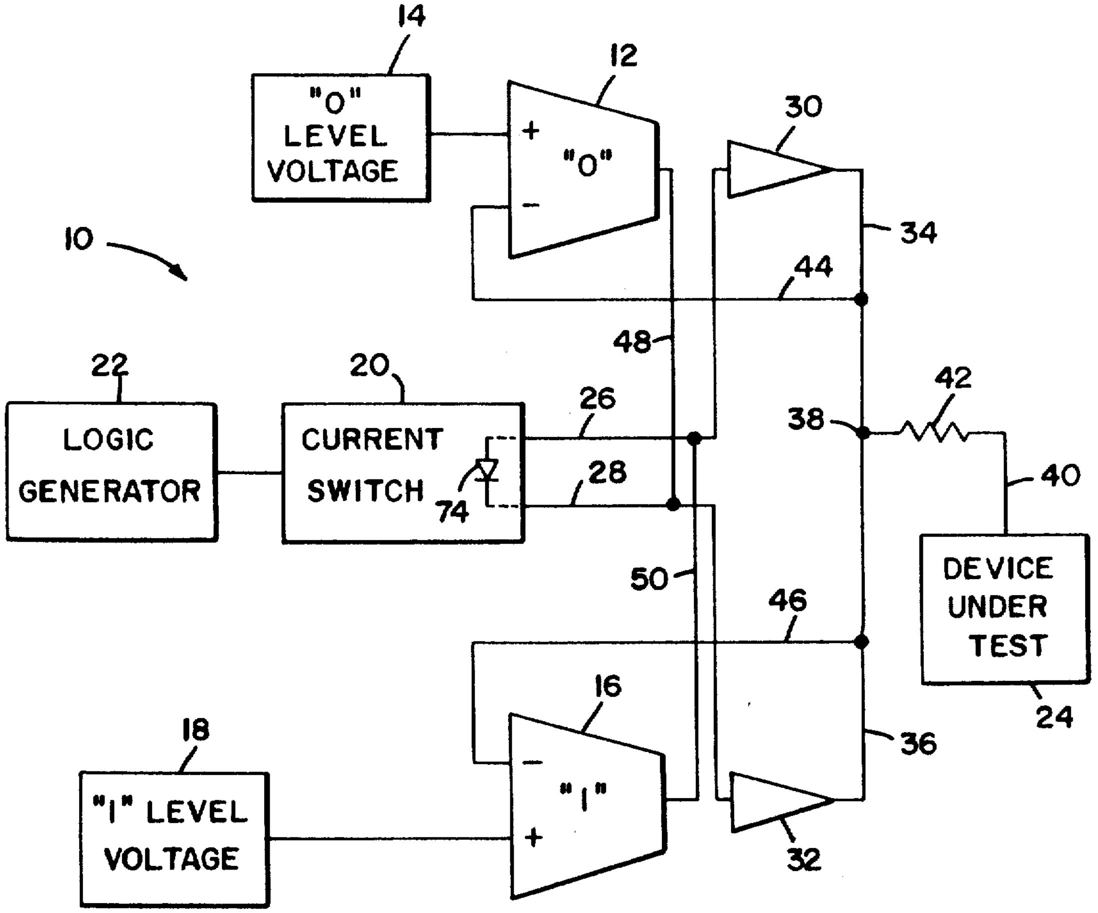

INVENTOR.
JAMES H. McPHAIL
BY
Owen, Wickersham & Erickson
ATTORNEYS

INVENTOR.
JAMES H. McPHAIL

BY

Owen, Wickersham & Erickson
ATTORNEYS

ELECTRONIC TESTING APPARATUS

This invention relates to an electronic, functional testing apparatus and more particularly to a buffer amplifier pulse driver for use in testing semiconductor logic circuit devices.

In testing logic circuit devices such as single chip semiconductors, and particularly those comprised of a multiplicity of field effect transistors forming a logic circuit, it is necessary to determine if the devices operate to change their state at the proper speed and with sufficient accuracy when inputs are applied within the range of its design operating levels. For many such devices the operating levels of the "zero" and "one" state conditions for clock or data elements are within narrow range limits and an extremely fast and accurate pulse generator capable of driving capacitive loads with fast rise and fall times must be provided in order to determine the true quality of the device being tested. For example, if a device is designed to operate by a pulse train or logic pattern including a clock pulse of 30 v. with a rise time of 50 nanoseconds, it is necessary to provide such a pulse output from a testing apparatus in order to determine whether the device actually operates within its design limits. Moreover, it is desired to provide a pulse train with all the pulses required to operate the device in the logic pattern for which the device was designed and at the proper "one" and "zero" levels.

A general object of the present invention is to provide a testing apparatus that will function in the aforesaid manner to produce an output that will vary between predetermined levels within a high accuracy tolerance in accordance with a desired pulsing or timing pattern.

Another object of the present invention is to provide a pulse conditioning test apparatus that can be set to produce an output at a "zero" or "one" level accurately and, therefore, is particularly adaptable for testing semiconductor logic circuit devices.

Another object of the present invention is to provide a pulse generating device that will produce an output pulse of sufficient amplitude to drive capacitive loads with fast rise and fall times.

Another object of the present invention is to provide a tester for logic circuit devices that will accurately determine at what "one" or "zero" level the device being tested is failing. With my apparatus the inputs to the "zero" and "one" level operational amplifiers are from sources that can preset to the desired valve within a close tolerance and this level is accurately held by the amplifier when the tester is producing the output from it.

Still another object of the present invention is to provide a pulse generating testing apparatus for logic circuit devices that will not overshoot by any significant amount as its output signal rises or falls rapidly from one preset level to another.

In accordance with the above, my apparatus is comprised of a pair of operational amplifiers, one being adapted to receive an input from a controllable source at a "zero" level and the other being adapted to receive an input from another controllable source at a "one" level. Thus, these "one" and "zero" level inputs can be set to the precise valve required for testing a particular device. Each of the amplifiers has an output driver stage with an input connected to an driven by a current switch which is adaptable to receive controlling input pulses in the same logic pattern that is desired at the output of the tester for application to the device being tested. The current switch provides the level transition drive for the output driver stages of the operational amplifiers. The driver stages thus function to provide the pulse transitions to and from predetermined levels independent of the operational amplifiers and also to hold the output at the desired level in conjunction with their operational amplifier. When the apparatus is operating at one output level, the operational amplifier for that level and its closed loop gain is maintaining the output signal for application to the device being tested within a very close tolerance. When the current switch is actuated to change the output to another level, both operational amplifiers essentially become "open circuit" or inoperative and are in the "freewheeling" state. The output signal now moves toward the new level in conformance with the logic pattern applied to the current switch and when it is reached the other amplifier for the new level comes into operation and holds the output at the new level. This process is repeated every time the input to the current switch makes a transition back and forth between levels. The combined functions of the current switch, the operational amplifier and the output drivers are accomplished by a unique circuit arrangement utilizing electronic switching means such as transistors. One group of transistors provide the capability for driving the output in both directions toward the one level and back toward the zero level. The output driver stages are separate transistors, and the operational amplifiers include transistors which function to hold the one and zero levels accurately.

Figure 2:
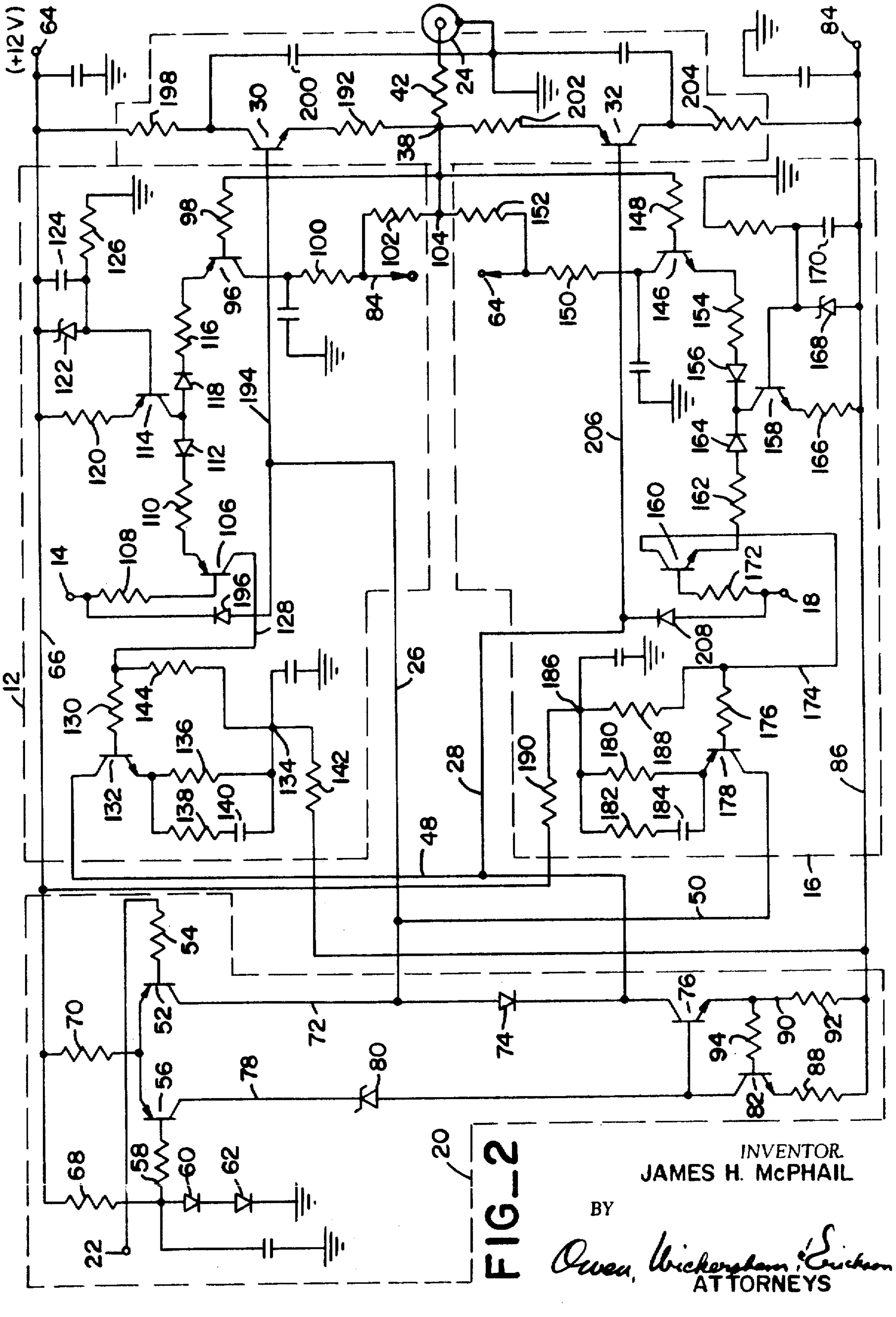

Other objects, advantages and features of the present invention will become apparent from the following detailed description of one embodiment thereof presented in accordance with 35 U.S.C. 112 and in conjunction with the accompanying drawing, in which:

FIG. 1 is a block diagram illustrating schematically the basic arrangement of the present invention; and FIG. 2 is a circuit diagram of a buffer amplifier pulse driver embodying the principles of my invention.

With reference to the drawing, FIG. 1 is a block diagram of a buffer amplifier pulse driver 10 adapted for use as a testing apparatus embodying the principles of the present invention. Generally, it comprises a first operational amplifier 12 which is adapted to receive an input from a suitable controllable voltage supply source 14 capable of providing a "zero" reference level voltage. A second operational amplifier 16 is adapted to receive an input from another controllable voltage source 18 capable of supplying a "one" reference level voltage. For example, in a negative going logic system, the "zero" level may be −2 v. and the "one" level may be −20 v., and these inputs are each applied to a noninverting terminal on their respective operational amplifier. A current switch 20 is connected to a suitable logic generator 22 and thus is adapted to receive a predetermined controllable logic signal that is a match of the logic pattern which is desired for exercising a device under test 24. That is, the logic input 22 supplies the desired excursion time pattern for the one and zero levels at the output of the device. The current switch 20 is connected by a pair of leads 26 and 28 to a first output driver stage 30 for the "zero" level operational amplifier 12 and to a second driver stage 32 for the "one" level operational amplifier 16, respectively.

These output driver stages provide the means for changing from the zero to the one level, and their output leads 34 and 36 respectively, are connected to a common junction 38. The latter is also connected to a main output lead 40 through a preselected impedance 42 to the device under test 24. The output of driver stages 30 and 32 provide negative feedback inputs to their operational amplifiers through a pair of leads 44 and 46 respectively which also are derived from the junction 38. The "zero" level operational amplifier is also connected by a lead 48 to the lead 28 from the current switch 20 and the "one" level operational amplifier 16 is similarly connected by a lead 50 to the lead 26 from the current switch to help form the output holding function of these components. As will be seen as the detailed description of my system proceeds, the logic generator provides a logic input in a predetermined wave form pattern in accordance with the desired clock or data inputs that are required to test the device 24, which is unusually a semiconductor logic circuit device comprised of a plurality of field effect transistors in a circuit pattern with its particular functional characteristics. When the logic generator calls for a change from one level to another, the current switch 20 activates the output driver 30 or 32 which cause the output level to move toward the new level. When the new level is reached, the appropriate operational amplifier essentially "grabs" and "holds" the output at the new level until another change is called for by the current switch.

Turning now to FIG. 2, a preferred form of circuit is shown which embodies the principles of the present invention and accomplishes the operation just described with respect to the block diagram. The current switch 20 comprises a PNP transistor 52 whose base is connected through a resistor 54 to the input from the logic generator 22. The emitter of transistor 52 is connected to the emitter of another PNP transistor 56 whose base is connected through a resistor 58 and a pair of diodes 60 and 62 in series to ground. A positive voltage input (e.g. 12 v.) is supplied to the apparatus from a suitable source at an input terminal 64 connected to a lead 66. Voltage from this latter lead is supplied through a resistor 68 to the diodes 60 and 62 and to the resistor 58 connected to the base of transistor 56. This positive voltage supply is also connected through a lead containing resistor 70 which supplies a positive bias to the emitters of both the transistors 52 and 56. The collector of transistor 52 is connected by a lead 72 containing a diode 74 to the collector of a third transistor 76 in the current switch. Similarly, the collector of the transistor 56 is connected by a lead 78 containing a zener diode 80 to the collector of a fourth transistor 82 in the current switch. A negative voltage supply (e.g. −30 to −50 v.) is supplied from a suitable source to an input terminal 84 from which extends a lead 86. This negative bias voltage is applied through a resistor 88 to the emitter of the transistor 82 and also through a parallel branch lead 90 containing a resistor 92 to the emitter of the transistor 76. The base of the transistor 82 is connected through a resistor 94 to lead 90 between the resistor 92 and the emitter of the transistor 76.

The zero level operational amplifier 12 comprises a transistor 96 whose base is connected through a resistor 98 to the junction 38. The collector of this transistor 96 is connected through a resistor 100 to the negative voltage source 84 and also through a resistor 102 to a junction 104 connected to the junction 38. Another noninverting transistor 106 is base connected through a resistor 108 to the "zero" level voltage source 14. The emitter of the transistor 106 is connected through a resistor 110 and a voltage standoff diode 112 to the collector of a bias control transistor 114. The emitter of transistor 96 is also connected through a resistor 116 and a diode 118 to the collector of the same transistor 114. This transistor forms part of a conventional current bias network, its emitter being connected through a resistor 120 to the plus power voltage source 64. The base of transistor 114 is connected through a network comprising a zener diode 122 and a capacitor 124 in parallel and also connected to the plus power source 64. The capacitor is also connected to ground through a resistor 126. The collector of the transistor 106 is connected through a lead 128 containing a resistor 130 to the base of a feedback control transistor 132 whose collector is connected by the lead 48 to the lead 28 from the current switch. The emitter of this transistor 132 is connected to a junction 134 through a bias control network comprising a resistor 136 in parallel with another resistor 138 which is in series with a capacitor 140. The junction 134 is connected through a resistor 142 to the negative voltage supply lead 86, and it is also connected through a resistor 144 to the base of the transistor 132.

The "one" level operational amplifier is similar in its circuit arrangement with the "zero" level amplifier 16 and comprises a transistor 146 whose base is connected through a resistor 148 to the junction 38. The collector of this transistor is connected through a resistor 150 to the positive voltage supply source 64 and also through a resistor 152 to the junction 104 that connects with the junction 38. The emitter of transistor 146 is connected through a resistor 154 and a diode 156 to the collector of a transistor 158 in a bias control network and the emitter of a transistor 160 is similarly connected through a resistor 162 and a diode 164 to the same collector. The emitter of this bias transistor 158 is connected to the negative voltage supply voltage lead 86 through a resistor 166 and its base is connected through a zener diode 168 and a capacitor 170 arranged in parallel also to the negative power source. The base of transistor 160 is connected through a resistor 172 to the "one" level voltage source 18, and its collector is connected through a lead 174 and a resistor 176 to the base of a feedback control transistor 178. The latter's collector is connected to the lead 26 in the current switch 20. The emitter of transistor 178 is connected through a network comprising in parallel a resistor 180 and a resistor 182 plus a capacitor 184 in series to a junction 186. The latter junction is also connected through a resistor 188 to the lead 174 interconnecting the transistors 160 and 178, and also through a resistor 190 to the lead 66 from the positive voltage power source 64.

The output driver stage 30 for the "zero" level operational amplifier 12 comprises an NPN transistor whose emitter is connected through a resistor 192 to the junction 38. The base of this driver transistor is connected by a lead 194 through a diode 196 to the "zero" level input supply 14 and also by the lead 26 to the lead 72 in the current switch 20 between the diode 74 and the transistor 52. The collector of the driver transistor 30 is connected through a current limiting resistor 198 to the positive supply lead 64 and also through a noise suppression capacitor 200 to a ground.

The output stage 32 of the "one" level operational amplifier 16 is similarly connected and comprises a PNP transistor whose emitter is connected through a resistor 202 to the junction 38. The collector of the transistor 32 is connected through a resistor 204 to the negative power lead 86 while its base is connected through a lead 206 and a diode 208 to the "one" level input source 18 and to the lead 28 from the current switch connected at a point between the diode 74 and the transistor 76. The remaining elements of the circuit which have not been specifically described in order to simplify the description are conventional elements which perform their well known functions of noise suppression or frequency rolloff such as the many branch leads to ground containing a bypassing capacitor.

In describing the operation of my buffer amplifier 10 let us assume that its output is connected through a known impedance 42 from the junction 38 to a device being tested 24, to which it is desired to apply a predetermined logic pattern with preset "zero" and "one" levels. With the "zero" and "one" voltages applied to the inputs 14 and 18, and assuming the preselected logic pattern voltage level at input terminal 22 to be at ground level, the transistor 52 is conducting and thus applying voltage to the base of the output driver transistor 30, thereby causing it to be in the conduction state. Thus, current is flowing through transistor 30 to the junction 38 and thence to the base of transistor 96, the inverting input to the operational amplifier 12, causing it to conduct. At this time, the transistor 106 is receiving a noninverting input from "zero" level source 14. Under these conditions the "zero" level operational amplifier 12 is holding the output at the "zero" reference level. The transistor 132 helps to do this by absorbing some of the output from transistor 52 and preventing transistor 30 from overconducting. If transistor 52 was allowed to drive the base of transistor 30 with the full amount of current that it was conducting, transistor 30 would be saturated and at the same time it would be trying to drive the output at junction 38 above the level of the base of transistor 96. This would cause the operational amplifier 12 to become inoperative. To prevent this, as soon as the transistor 30 has taken the output 38 to the preset zero level, transistor 106 receives current through the current limiting network including transistor 114 and causes transistor 132 to conduct and accept the current from transistor 52 less the base current that goes into either output driver transistor 30 or 32. Thus, transistors 132 and 52 essentially have the same current flowing in them when they are set at the zero level. This important holding function of my apparatus may be summarized as follows: As soon as the output at junction 38 is driven up to the point where the base of transistor 96 and 106 are of equal magnitude, it is the desired zero reference level, and this level is maintained by taking away excess current from the collector of transistor 52. To accomplish this, the collector of transistor 132 is connected to the cathode of the diode 74 in the current switch and functions to absorb some of the current from transistor 52.

If the output at junction 38 tends to go up or down, transistor 96 tends to conduct or not to conduct current. For example, if the level at junction 38 goes up too far or becomes too positive, the current in transistor 96 starts to cut off and more current starts to conduct in transistor 106, thereby causing transistor 132 to conduct even more current. Since that current is not available from transistor 52 anymore, its collector is pulled down which in turn brings transistor 30 down, also pulling the level at junction 38 down to the point it is trying to maintain, namely the "zero" level from the source 14.

Now, if the input to the current switch 20 is changed to some positive voltage, in accordance with a predetermined logic pattern from the logic generator 22, transistor 56 which is receiving a voltage at its base from the plus voltage supply will start conducting. The zener diode 80 connected to the collector of transistor 56 acts to reduce its power dissipation so that it absorbs some of the power from transistor 56. The current from the collector of transistor 56 causes transistor 76 to start conducting which causes transistor 82 to start conducting, and the latter will continue to conduct until a predetermined valve of current from transistor 56 is reached. This value is determined by the resistor 70 and the voltage that is derived from the plus voltage supply in lead 66 to ground less the drops through diodes 60 and 62. The same positive input voltage (e.g. 12 v.) less the drops of diodes 60 and 62 and base-emitter drop of transistor 56 is found across resistor 70 and that voltage determines the current for transistor 56 which turns on transistor 76 and 82. The resistor 88 plus the emitter-base drop of transistor 82 provides a voltage drop across the resistor 92 which thus controls the maximum current that transistor 76 will conduct. This maximum current flowing through the transistor 76, the leads 28 and 206, now drives the PNP transistor 32, the output driver device to a "one" level, thus bringing the junction 38 down to a "one" level. When junction 38 gets down to a one level the bases of transistors 146 and 160 in the "one" level operational amplifier 16 are approximately at the very same voltage, and it is desired to hold at the "one" reference level, as supplied from the source 18. Operating in a similar fashion to transistor 106 in the "zero" level amplifier 12, the transistor 160 commences to conduct, thereby causing the control transistor 178 to start conducting and absorbing the current put out from transistor 76. Thus, the transistor 178 operates in the same manner as transistor 132 to absorb current from transistor 76 to maintain the output driver transistors 30 and 32 and hold the junction 38 at the "one" level. If junction 38 should become more negative than it should, transistor 146 will turn off, transistor 160 will turn on harder, thereby turning on transistor 178 harder, so that it will try to take more current from transistor 76 than the latter will supply. This will pull the collector of transistor 76 more positive which will drive transistors 30 and 32, thereby causing the level at junction 38 to go more positive and return to and maintain the "one" level reference supplied at by the source 18.

The circuit as shown is adapted for use with a positive voltage input (positive logic) from the logic generator. If it is desired to use a negative logic input signal to control the logic pattern and still maintain negative logic outputs, the base leads to transistors 52 and 56 would merely be reversed.

The general operation of my buffer amplifier may be summarized as follows: When the apparatus 10 is in operation with its output at, for example, the "one" level, the operational amplifier 12 or 16 for that level is holding the output within precise tolerances. When the logic input to the current switch 20 says to change the output to a different level, i.e. the "-zero" level, both operational amplifiers become inoperative and the output driver stage 30 of the "zero" level operational amplifier 12 immediately starts making the transition from the "one" to the "zero" level. When it reaches a level very near the "zero" level, the operational amplifier 12 functions to "-grab" or home in on that "zero" reference level, and it holds that new level until the current switch tells it to change state in accordance with its logic pattern input.

The operation of my buffer-amplifier is extremely fast and accurate. The output levels to a device being tested can be held to exact tolerances (i.e. around 0.1 percent) and in the transitional mode the device 10 can drive large capacitive loads (e.g. 500 pf.) with output rise and fall times of less than 100 nanoseconds with a 20 v. pulse output. The apparatus is, therefore, particularly adaptable for testing or exercising logic circuit devices comprised of large arrays of field effect semiconductors.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A buffer-amplifier pulse driver apparatus for providing an output variable to predetermined levels with fast rise and fall times comprising:

a first level setting means adapted to receive a constant voltage input at a predetermined constant level;

a second level setting means adapted to receive a constant voltage input at a predetermined constant level that is higher than the level to the first level setting means;

a current switch adapted to receive an input with a predetermined timing pattern that is desired for the output of the apparatus and connected to outputs from both said level setting means; and a separate output driver means for each level setting means, each said driver means having an input connected to said current switch, said driver means being thereby actuated alternately to provide the output of the apparatus in a pulse pattern having precisely the same timing pattern received by said current switch with the pulses of the output pattern having the two levels supplied to said level setting means.

2. The apparatus as described in claim 1 wherein both said level setting means is an operational amplifier.

3. The apparatus as described in claim 1 wherein said output driver means comprises an NPN transistor and a PNP transistor connected to a common junction at the output of the apparatus.

4. The apparatus as described in claim 2 wherein each said operational amplifier comprises first and second transistors having emitters connected in parallel to a bias network from a voltage supply, said first transistor having a base connection to said junction and said second transistor having a base connection to the constant voltage level input of the operational amplifier, and a third transistor having its base connected to said second transistor and also to said current switch for maintaining the same level at said junction as applied to the operational amplifier.

5. The apparatus as described in claim 2 wherein said current switch comprises first and second transistors having emitters connected to a plus voltage supply, said first transistor having its base connected to the input to said current switch and its collector connected to said output driver means, third and fourth transistors connected to a negative voltage source with said third transistor connected to said output driver means, and means in said operational amplifiers for absorbing some of the current from either said first transistor or said third transistor to hold said driver means and thus the output of the apparatus at the levels applied to said operational amplifiers.

6. Apparatus for providing an output that will vary between predetermined levels with fast rise and fall times in accordance with a preset logic timing pattern that is desired for testing or exercising a logic circuit device, said apparatus comprising:

a first operational amplifier adapted to receive a constant voltage input at a predetermined constant level and having an output driver stage;

a second operational amplifier adapted to receive a constant voltage at a predetermined level that is higher than the level supplied to said first operational amplifier, and having its own output driver stage; each said output driver stage having an output providing a feedback to the input of its operational amplifier and also an output for application to the semiconductor device under test;

a logic generator means for providing pulses timed in predetermined logic pattern;

a current switch having an input connected to said logic generator means for producing an output with the same said predetermined logic pattern, said current switch output being connected to the input of each said driver stage for both said operational amplifiers;

and means connecting the output of each said operational amplifier to an interconnection between said current switch and the output driver stage of the other operational amplifier;

whereby with the apparatus producing an output at the level of said first operational amplifier an output from said current switch in response to a transition signal from said logic generator causes both said operational amplifiers to become temporarily inoperative and the output driver stage for said second operational amplifier immediately commences a transition to its preset level, said second operational amplifier being responsive to its own output driver stage to become operative again and to maintain its preset output as its driver stage reaches this preset level, the process being reversed when said current switch receives another signal from said logic generator, the apparatus thereby producing a precise output alternately at the two preset levels of said operational amplifiers in accordance with the logic pattern supplied to said current switch.

7. The apparatus as described in claim 6 wherein said logic generator means supplies a positive voltage input so that output of the apparatus supplies a negative voltage output with the same logic pattern as the voltage input.